United States Patent
Westphal

(10) Patent No.: US 9,002,921 B2
(45) Date of Patent: Apr. 7, 2015

(54) METHOD FOR NETWORK CODING PACKETS IN CONTENT-CENTRIC NETWORKING BASED NETWORKS

(71) Applicant: Futurewei Technologies, Inc., Plano, TX (US)

(72) Inventor: Cedric Westphal, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 304 days.

(21) Appl. No.: 13/707,768

(22) Filed: Dec. 7, 2012

(65) Prior Publication Data

US 2013/0151584 A1    Jun. 13, 2013

Related U.S. Application Data

(60) Provisional application No. 61/569,106, filed on Dec. 9, 2011.

(51) Int. Cl.
*G06F 15/16* (2006.01)
*H04L 29/06* (2006.01)
*H04L 29/08* (2006.01)

(52) U.S. Cl.
CPC .............. *H04L 65/60* (2013.01); *H04L 67/06* (2013.01); *H04L 29/08729* (2013.01)

(58) Field of Classification Search
USPC ............... 709/202; 370/328, 400; 375/240.07
See application file for complete search history.

(56) References Cited

U.S. PATENT DOCUMENTS

| | | | |
|---|---|---|---|
| 8,265,140 B2* | 9/2012 | Mehrotra | 375/240.02 |
| 2010/0080290 A1* | 4/2010 | Mehrotra | 375/240.07 |
| 2010/0260189 A1* | 10/2010 | Ansari et al. | 370/400 |
| 2011/0164562 A1* | 7/2011 | Qiu et al. | 370/328 |
| 2013/0151584 A1* | 6/2013 | Westphal | 709/202 |

FOREIGN PATENT DOCUMENTS

WO    2011043754 A1    4/2011

OTHER PUBLICATIONS

Foreign Communication From A Counterpart Application, PCT Application PCT/US2012/068377, International Search Report dated Apr. 18, 2013, 6 pages (Continued)

*Primary Examiner* — Tammy Nguyen
(74) *Attorney, Agent, or Firm* — Conley Rose, P.C.; Grant Rodolph; Brandt D. Howell

(57) ABSTRACT

A network node, comprising a data store comprising a content object, wherein the content object comprises multiple content chunks, a receiver configured to receive a request from a requesting network node for at least one chunk of the content object, a transmitter configured to transmit data, and a processor coupled to the receiver, the transmitter, and the data store, wherein the processor is configured to encode the content using the multiple content chunks and to instruct the transmitter to transmit the encoded content and an encoding indicator to the requesting network node, wherein the encoding indicator provides the requesting network node with an encoding mechanism that the requesting network node uses to decode the encoded content in the payload into the multiple content chunks after the requesting network node receives a number of packets comprising the encoded content equal to the number of content chunks that comprise the content object.

20 Claims, 7 Drawing Sheets

(56) References Cited

OTHER PUBLICATIONS

Foreign Communication From A Counterpart Application, PCT Application PCT/US2012/068377, Written Opinion dated Apr. 18, 2013, 10 pages.
Li, R., "Linear Network Coding," IEEE Transactions on Information Theory, vol. 49, Issue 2, Feb. 1, 2003, pp. 371-381.
Trossen, D., et al., "Arguments for an Information-Centric Internetworking Architecture," ACM SIGCOMM Computer Communication Review, vol. 40, No. 2, Apr. 2010, pp. 26-33.
Rajahalme, J., et al., "On Name-Based Inter-Domain Routing," Elsevier, Computer Networks 55 (2011), Dec. 19, 2010, pp. 975-986.
Ho, T., et al., "The Benefits of Coding over Routing in a Randomized Setting," ISIT 2003, Yokohama, Japan, Jun. 29-Jul. 4, 2003, p. 442.
Jacobson, V., et al., "Networking Named Content," Palo Alto Research Center (PARC), Oct. 13, 2009, 13 pages.
Gkantsidis, C., et al., "Network Coding for Large Scale Content Distribution," IEEE Infocom 2005, pp. 1-11.
Karila, A., et al., "Pursuit, Publish-Subscribe Internet Technology, Project Presentation," Pursuing a Pub/Sub Internet, http://fp7pursuit.ipower.com/PursuitWeb/wp-content/uploads/2011/03/INFSO-ICT-257217_PURSUIT_D5.2_Project_Presentation.pdf, downloaded from the Internet Nov. 15, 2012, pp. 1-18.
Koetter, R., et al., "An Algebraic Approach to Network Coding," IEEE/ACM Transactions on Networking, vol. 11, No. 5, Oct. 2003, pp. 782-795.
Montpetit, M., et al., "Community Viewing Meets Network Coding: New Strategies for Distribution, Consumption and Protection of TV Content," Network Coding and Reliable Communications Group, Second W3C Web and TV Workshop, Berlin, Feb. 8-9, 2011, 11 pages.
Dimakis, A., et al., "Network Coding for Distributed Storage Systems," INFOCOM 2007, 26th IEEE International Conference on Computer Communications, May 6-12, 2007, 13 pages.
Sundararajan, J., et al., "Network Coding Meets TCP: Theory and Implementation," Proceedings of the IEEE, vol. 99, No. 3, Mar. 2011, pp. 490-512.
Jokela, P., et al., "LIPSIN: Line Speed Publish/Subscribe Inter-Networking," TR09-0001, Publish-Subscribe Internet Routing Paradigm (PSIRP), Jan. 1, 2008-Jun. 30, 2010, 43 pages.
Karila, A., et al., "Pursuit, Publish-Subscribe Internet Technology," Pursuing a Pub/Sub Internet, FP7 ICT Objective 1.1, The Network of the Future, http://fp7pursuit.ipower.com/PursuitWeb/wp-content/uploads/2011/03/PURSUIT_fact_sheet.pdf, Sep. 2010-Feb. 2013, downloaded from the Internet Nov. 15, 2012, 2 pages.
Seferoglu, H., et al., "Opportunistic Network Coding for Video Streaming over Wireless," IEEE Journal on Selected Areas in Communications—Special Issue on Network Coding for Wireless Communication Networks, vol. 27, Issue 5, Jun. 2009, pp. 713-728.
Vinglemann, P., et al., "Synchronized Multimedia Streaming on the iPhone Platform with Network Coding," Consumer Communications and Networking, IEEE Communications Magazine, Jun. 2011, pp. 126-132.
Lucani, D., et al., "Systematic Network Coding for Time-Division Duplexing," 2010 IEEE International Sysmposium on Information Theory Proceedings (ISIT), Jun. 13-18, 2010, pp. 2403-2407.
Liu, Z., et al., "UUSee: Large-Scale Operational On-Demand Streaming with Random Network Coding," IEEE Infocom, 2010, pp. 2070-2078.
Flegkas, P., et al., "Storage Replication in Information-Centric Networking," Proceedings of IEEE International Conference on Networks (ICON), Singapore, Dec. 14-16, 2011, 6 pages.

\* cited by examiner

METHOD FOR NETWORK CODING PACKETS IN CONTENT-CENTRIC NETWORKING BASED NETWORKS

CROSS-REFERENCE TO RELATED APPLICATIONS

The present application claims the benefit of U.S. Provisional Patent Application No. 61/569,106 filed Dec. 9, 2011 by Cedric Westphal and entitled "Method for Network Coding Packets in Content-Centric Networking Based Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Content-centric networking (CCN), as well as information centric networking (ICN), content oriented networking (CON), content-based networking (CBN), and data-oriented networking (DON) are alternative approaches to the architecture of computer networks. These architectures provide communication networks that allow a user to focus on the data he or she needs, rather than having to reference a specific, physical location from which that data may be retrieved.

In CCN, the node may send an interest packet to the network when a node wants to access a piece of content. The network then forwards the interest to one or more copies of the content object using the name of the content for routing. Once the interest reaches a cache holding a copy of the content object, a data packet may be sent back. The data packet may retrace the path followed by the interest in the reverse direction to the node which requested the content. Each data packet may be a chunk of a larger content object.

The interest may request a specific chunk, e.g. "www.foo.com/Dir/File/C1" or just initiate the transfer of a file by requesting www.foo.com/Dir/File/, which may be implicitly understood as a request to send the first chunk in return. This architecture may naturally allow routers along the path to store the content in its local storage (e.g., content store). This allows the router to serve the cached content in response to an interest rather than going to the origin server of the content. One important aspect of CCN is that it may fully disconnect the delivery of the content from any network location. Thus, rather than establishing an end-to-end connection, the content is received chunk by chunk from wherever those chunks were stored in the network. This may also be embodied within the security architecture, which may be built independently of the connection endpoints.

SUMMARY

In one embodiment, the disclosure includes a network node, comprising a data store comprising a content object, wherein the content object comprises multiple content chunks, a receiver configured to receive a request from a requesting network node for at least one chunk of the content object, a transmitter configured to transmit data, and a processor coupled to the receiver, the transmitter, and the data store, wherein the processor is configured to encode the content using the multiple content chunks and to instruct the transmitter to transmit the encoded content and an encoding indicator to the requesting network node, and wherein the encoding indicator provides the requesting network node with an encoding mechanism that the requesting network node uses to decode the encoded content in the payload into the multiple content chunks after the requesting network node receives a number of packets comprising the encoded content equal to the number of content chunks that comprise the content object.

In another embodiment, the disclosure includes a method in a content router for retrieving content in a content centric network, comprising receiving a request for content from a content consumer, wherein the content comprises a plurality of content chunks, forwarding the request to multiple network nodes, receiving a plurality of reply packets from one or more of the multiple network nodes, wherein each of the reply packets comprises a linear combination of the plurality of content chunks, wherein each linear combination of the plurality of content chunks is linearly independent of the other linear combinations of the plurality of content chunks, and wherein each reply packet comprises coefficients used to create the linear combination of the plurality of content chunks, and decoding with a processor the plurality of packets to obtain the decoded plurality of content chunks.

In another embodiment, the disclosure includes, in a content router in a content centric network, comprising a receiver configured to receive a request for content, wherein the request comprises a content name, wherein the content comprises a plurality of content chunks, a processor coupled to the receiver and configured to determine a plurality of network nodes containing at least some of the content chunks, and a transmitter configured to forward the request to the plurality of network nodes, wherein the receiver is further configured to receive a plurality of reply packets from at least some of the plurality of network nodes, wherein each reply packet comprises a linear combination of the plurality of content chunks and an indicator of the integer coefficients used by the one of the plurality of network nodes to create the linear combination, wherein the processor is further configured to obtain the plurality of content chunks from the plurality of reply packets using the linear combination of the plurality of content chunks from each of the plurality of reply packets and the integer coefficients associated with each linear combination.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
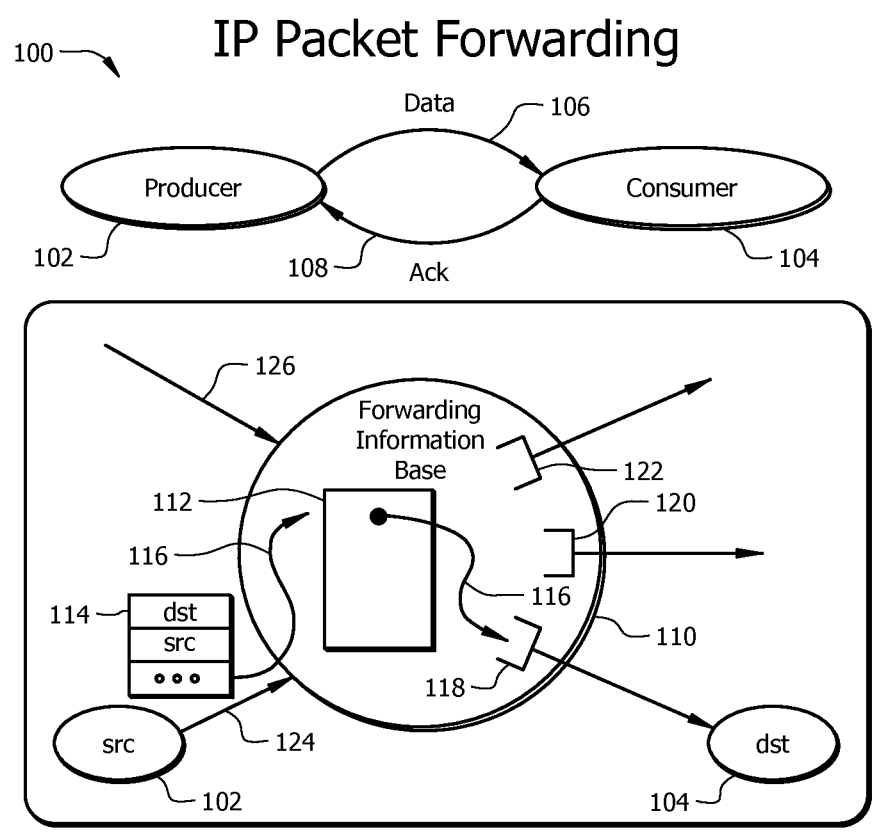
FIG. 1 is a diagram illustrating a system for forwarding packets in an Internet Protocol (IP) packet forwarding network according to an embodiment.

FIG. 1 is a diagram illustrating a system 100 for forwarding packets in an Internet Protocol (IP) packet forwarding network according to an embodiment. System 100 may comprise a producer (or source) 102, a consumer (or destination) 104, and a network node 110. The network node 110 may be a router, switch, or other device configured to forward data packets through a network. The network node 110 may comprise a forwarding information base (FIB) 112, and a plurality of ingress ports 124, 126, and a plurality of egress ports 118, 120, 122. The producer 102 may transmit data 106 to the consumer 104 and receive an acknowledgement (Ack) 108 back from the consumer 104. The data 106 may follow a path 116 from the producer 102 through the network node 110 to the consumer 104. The data 106 may comprise a packet 114 comprising a destination IP address and a source IP address. The network node 110 may use the destination IP address in the packet 114 to consult the FIB 112 in order to determine the appropriate egress port 118 on which to forward the data 106 such that the data 106 reaches the consumer 104.

Figure 2:
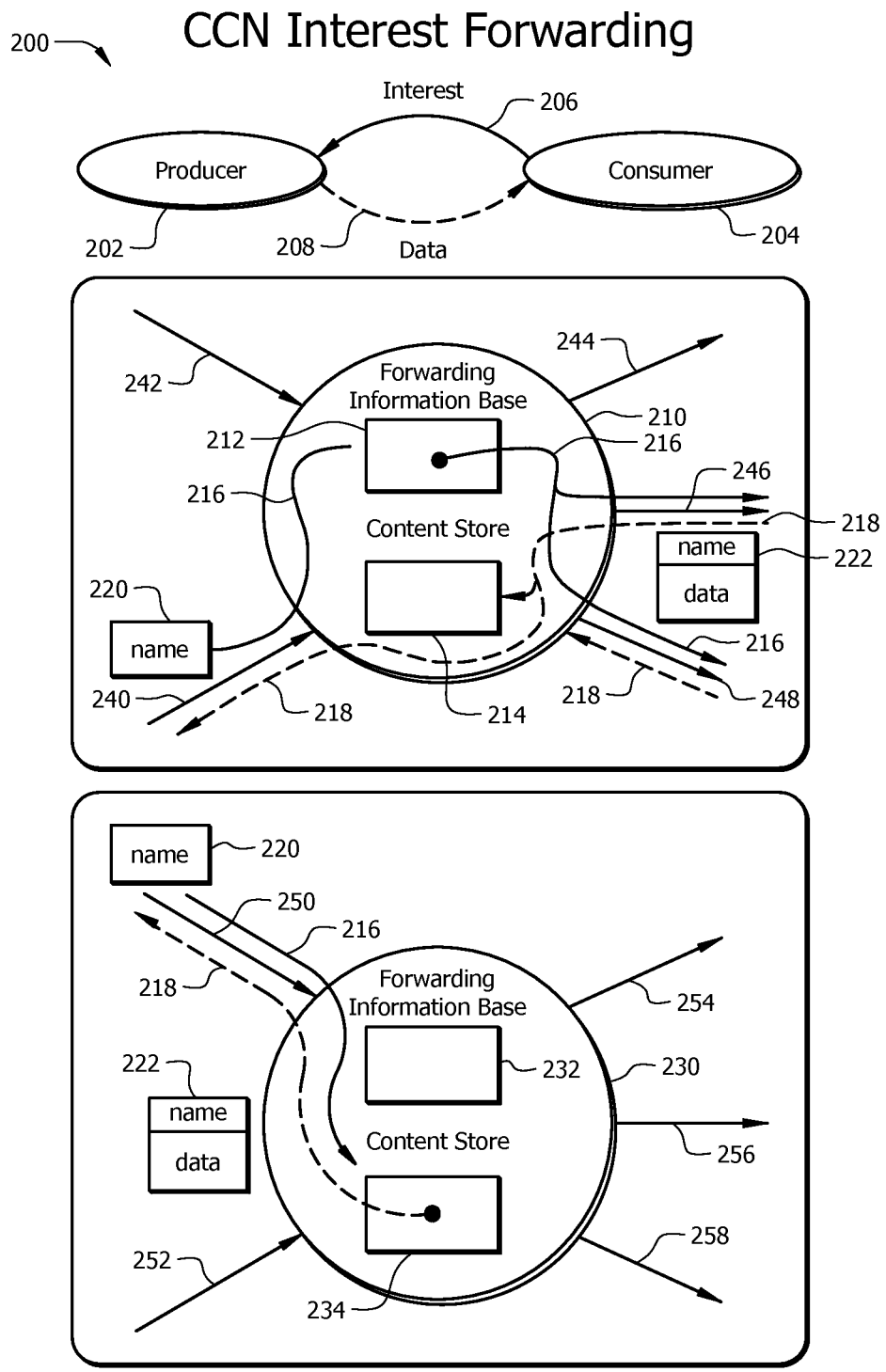
FIG. 2 is a diagram illustrating a system for Content-Centric Networking (CCN) interest forwarding in accordance an embodiment.

FIG. 2 is a diagram illustrating a system 200 for CCN interest forwarding in accordance an embodiment. System 200 may comprise a producer 202, a consumer 204, network node 210, and network node 230. The consumer 204 may transmit an interest 206 to the producer 202 and desire data 208 in return. The interest packet may traverse a path 216 through one or more network nodes which may include network nodes 210, 230. The data 208 may be returned from the producer 202 or from one of the content routers in the system 200. As depicted, the data may follow a path 218 from the network node 230 through network node 210 to the consumer 204. Network nodes 210, 230 may be content routers or other network devices configured to forward, retrieve, and store data packets in a network. Network node 210 may comprise a FIB 212, a content store 214, a plurality of ingress/egress ports 240, 242, 244, 246, 248. Similarly, network node 230 may comprise a FIB 232, a content store 234, a plurality of ingress/egress ports 250, 252, 254, 256, 258. Ports 240, 242, 244, 246, 248, 250, 252, 254, 256, 258 may also be referred to as faces and may each comprise a transceiver (e.g., a transmitter and a receiver).

In contrast to system 100, the interest 206 may comprise a packet 220 comprising a name of the content desired by the consumer 204 rather than comprising a destination IP address. The network node 210 may receive the interest packet 220 at port 240. The network node 210 may inspect the packet 220 to determine the name of the data (e.g., content) 208 requested by the consumer 204. Based on the name contained in the packet 220, the network node 210 may consult its content store 214 to determine whether the content is stored therein and, if so, provide the content to the consumer 204 without forwarding the packet 220. If the content store 214 does not contain the requested content, then the network node 204 may, using the name of the content within the packet 220, consult the FIB 212 to determine the port or ports on which to forward the packet 220 in order to obtain the requested data 208. The network node 210 may determine that the content identified by the name in the packet 220 may be obtained from two different nodes coupled to the network node 210 on two different ports 246, 248. The network node 210 may then forward the packet 220 on both ports 246, 248 as indicated by path 216.

Network node 230 may receive the interest packet 220 on port 250 from network node 210 as indicated by path 216. The network node 230 may retrieve the requested content from its content store 234 based on the name of the content in the interest packet 220. The network node 230 may forward the content in a data packet 222 back along path 218 to the network node 210. The data packet 222 may comprise the name of the content and the data payload (e.g., content) corresponding to the name.

The network node 210 may receive the data 208 from two different network nodes on two different ports 246, 248 as indicated by the path 218. The data 208 may be received by the network node 210 on port 246 before receiving the data 208 on port 248. The network node 210 may store the content in the data packet 222 in the content store 214 when the network node 210 receives the data 208 on port 246. The network node 210 may then forward the data packet 222 with the data 208 to the consumer on port 240 as indicated by path 218. When the network node 210 receives the data 208 on port 248, the network node 210 may drop the data packet received on port 248 since the network node 210 has already received and stored the data 208 contained in that data packet. Thus, system resources may be wasted since the same data is received by the network node 210 twice. The data 208 received on port 248 may not comprise any additional information not already received by the network node 210 on port 246.

Disclosed herein is a system, method, and apparatus for network coding and forwarding of packets in a CCN based network. In an embodiment, an interest packet may be received by a content router and forwarded to two or more network nodes from which the content associated with the interest packet may be obtained. The content requested may comprise a plurality of components or chunks. Each network node that receives the interest packet and that contains the content requested by the interest in its content store may retrieve the content and construct multiple data (or content) packets and transmit the data packets to the content router. The data packets may comprise encoded data containing information from one or more of the content chunks that comprise the data. Each network node may encode the content independently and transmit packets with the encoded content to the content router. Each data packet transmitted by the network nodes may comprise different encoding such that all of the content may be decoded by the content router after receiving a sufficient number of data packets.

In an embodiment, the network node may encode the content by creating a linear combination of the chunks that comprise the data. The packets may comprise information to indicate how the combination of chunks is encoded in the packet. The packet may comprise a header with a flag or other indicia indicating the encoding method. The header may indicate the coefficients used to form a linear combination of the content chunks. In an embodiment, the semantics of the name of the content contained in the packet may be used to indicate the method of encoding to allow the content router to decode the chunks. The size of each chunk may be chosen to optimize the trade-off between various parameters. For example, the size of the chunk may be selected based on the maximum transfer units on the intermediate links and the volume of the Interest traffic and latency at the receiver. The disclosed network coding in a CCN environment provides a mechanism for multiple end points to provide information to a receiver in an asynchronous and distributed manner.

Figure 3:
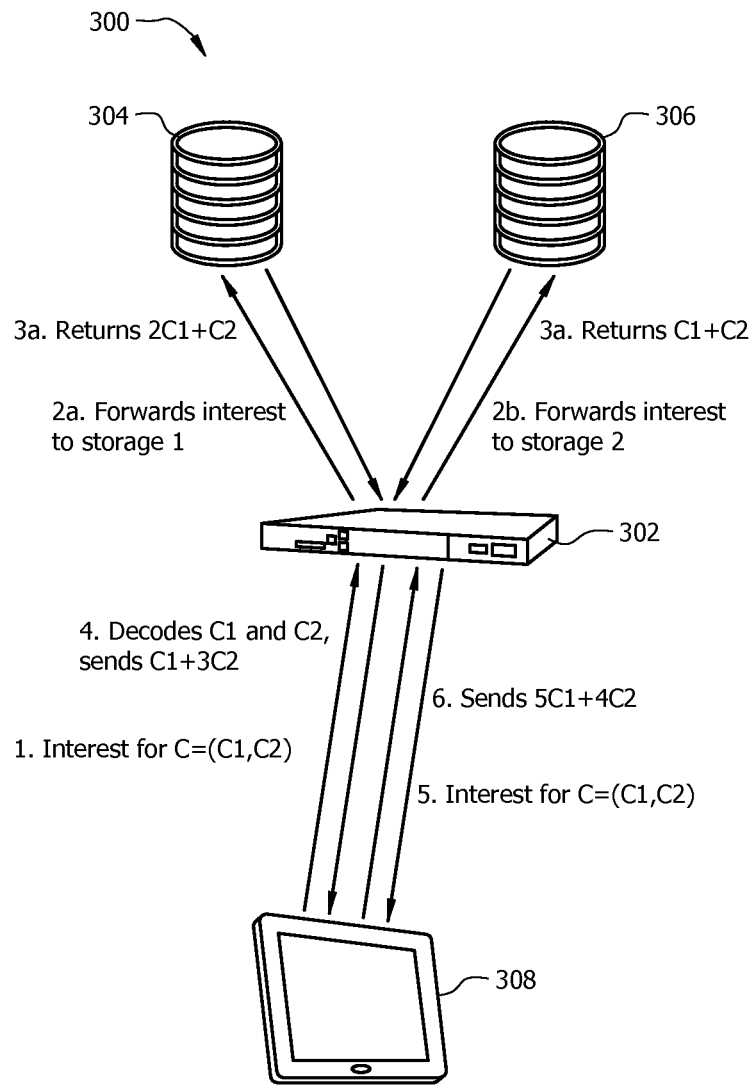
FIG. 3 is a diagram of a system for network coding and forwarding of packets in a CCN based network according to a disclosed embodiment.

FIG. 3 is a diagram of a system 300 for network coding and forwarding of packets in a CCN based network according to a disclosed embodiment. System 300 may comprise multiple content stores 304, 306, a network node 302, and a content consumer 308. Content stores 304, 306 may be any network node capable of caching or storing content. Content stores 304, 306 may be content routers or cache servers. Network node 302 may be a router, switch, or other device capable of forwarding packets through more than one interface on the network node 302. Network node 302 may be a content router. Content consumer 308 may be any device capable of requesting and receiving content over a network. For example, content consumer 308 may be a tablet computer, a laptop computer, a desktop computer, or a wireless mobile device.

Content consumer 308 may transmit an interest packet to the network node 302. The interest packet may comprise name identifying a content object C which may be composed of chunks C1 and C2. The interest packet may comprise a request for the content object C. The network node 302 may receive the interest packet and router the interest packet to content stores 304, 306 over two different interfaces based on the name of the content. The interfaces may be of the same type (e.g., both are Ethernet interfaces or both are wireless interfaces) or of different types (e.g., a $3^{rd}$ generation of mobile telecommunications technology (3G) interface and a WiFi interface). Each content store 304, 306 may reply to the interest with a data packet that may comprise encoded content. The encoded content may be a linear combination of chunks C1 and C2. Each content store 304, 306 may independently encode the content such that the network node 302 may receive two independent linear combinations of C1 and C2 thereby enabling the network node 302 to decode the encoded content into the chunks C1 and C2. For example, the first content store 304 may return a data packet comprising a linear combination of C1 and C2 as 2C1+C2. The second content store 306 may return a data packet comprising a different linear combination of C1 and C2, namely, C1+C2.

Upon receipt of the first data packet, the network node 302 may forward the first data packet to the content consumer 308 and then, upon receipt of the second data packet, forward the second packet to the content consumer 308. The network node 302 may decode the first and second data packets to obtain the un-encoded chunks, C1 and C2. Alternatively, the network node 302 may receive the two data packets and decode C1 and C2 and then re-encode the content C into two new data packets to send to the content consumer 308. The re-encoded content may comprise one packet comprising C1+3C2 and one packet comprising 5C1+4C2. Each packet may comprise information indicating how the content was encoded to enable the content consumer to decode the two data packets. The content consumer 308 may receive the encoded content and then decode the content to retrieve chunks C1 and C2.

In an embodiment, each of the content stores 304, 306 may each transmit two data packets to the network node 302 where each data packet transmitted by an individual content store 304, 306 is linear independent from the other data packet transmitted by the same content store 304, 306. Thus, if the network node 302 receives a reply from only one of the content stores 304, 306, the network node 302 may nevertheless decode the data packets to obtain the entire content.

The number of packets that are transmitted by the content stores 304, 306 may be one each unless additional packets are requested by the network node 302. For example, if instead of two chunks, the content C comprises four chunks, then the content stores 304, 306 may transmit two linearly independently encoded data packets and the network node 302 may receive two or more linearly independent encoded data packets from two or more other nodes in the network. If there are no other components that contain the content, the network node 302 may request that content stores 304, 306 transmit additional linearly independent encoded data packets until the network node 302 has received a sufficient number of data packets in order to decode the content into its constituent parts.

If one of the content stores 304, 306 holds only one of the chunks C1 and C2 and not the entire content object C, then that content store 304, 306 may return the chunk it holds. For example, if content store 306 holds only chunk C1, then it may return C1 in response to the interest received from the network node 302. The content store 304 may return a linear combination of both C1 and C2. Thus, using network coding increases the likelihood of finding the missing bits of content.

The examples described above use network coding to encode within the same object transmission. However, if a router receives different linear combinations intended for different receivers, it can combine these as well in the same manner.

In an embodiment, the network node 302 may transmit a request to stop submitting data packets to each of the content stores 304, 306 once the network node 302 has received a sufficient number of packets to decode the encoded data into the respective content chunks that comprise the content. This may reduce unnecessary traffic over the network.

Without network coding, the interests may be forwarded to copies of the object on content stores 304, 306, as depicted in FIG. 2, and each of content stores 304, 306 may start the transmission of the first chunk C1. The network node 302 would thus receive two copies of C1 from each interface (provided that the paths are fully independent) in the case without network coding.

Rather than sending C1 as an implicit response to "www-.foo.com/Dir/File", both content stores 304, 306 may send a linear combination of the two chunks, e.g. C1+2C2 for the first one and 2C1+C2 for the second one with the disclosed network coding. Alternatively, the name in the interest packet may explicitly make a request for network coded chunks, e.g. using a specific syntax such as "www.foo.com/Dir/File/NC-Chunk".

As noted above, the network node 302 may reconstruct the full data objects C1 and C2 upon reception of these two encoded chunks. Note that the transmission bandwidth used in the case of network coding may be exactly the same as in the case without, but in the case of network coding, the whole data object may be retrieved (e.g., C1 and C2 may be obtained from decoding the two independent linear combinations of C1 and C2 received from content stores 304, 306), while in the case without network coding, half of the capacity may be wasted (e.g., both content stores transmit only C1). Note also that retrieving C1 and C2 may be achieved in an asynchronous manner. The encoding of the packets received from the two caches should be linearly independent. Since these are generated independently by the content stores 304, 306, it might not always be the case that the packets are linearly independent, but for randomly generated codes, the probability of such an occurrence may be made arbitrarily low.

The rate of each transmission over the two different interfaces of the network node 302 does not have to be known a priori. If one interface of the network node 302 is three times faster than the other, three times as many linear combinations may arrive there, but both interfaces may be bringing fresh information at their respective full throughput. The total transmission rate may be the additive capacity of both interfaces, and this capacity may be achieved in a fully distributed manner.

As another example, consider the same object composed of chunks C1 and C2, but where the network node 302 receives an interest from content consumer 308 for only C1. The network node 302 may attempt to locate C1 upon receiving an interest from content consumer 308. The router may not have an entry for this name in its FIB and may attempt to find it from two neighbours, content stores 304, 306. If both these neighbours do have the content, they both will respond to the interest with network coded packets that may be linear combinations of C1 and C2. The network node 302 may decode the content into C1 and C2 and save both in its local content store. The network node 302 may then transmit C1 to the content consumer 308. The content consumer 308 may then issue an interest packet with a request for C2. However, the network node 302 may have previously cached C2 and may provide C2 to the content consumer 308 without forwarding the interest to the content stores 304, 306. In this case, the total bandwidth amount consumed is reduced over what would occur without network coding. Furthermore, the delay is also reduced by taking advantage of the caching opportunity within the network. The second roundtrip to fetch C2 is only from the content consumer 308 to the network node 302, and not all the way to one of the repositories.

In a CCN without network coding, caching would benefit another user when the other user requests C1 and C2 from the network node 302 later on. With network coding, it also benefits the first requesting user during the first transmission by populating the cache at the network node 302 faster.

Each chunk in CCN carries some metadata. In particular, it carries some security information regarding the content of the data packet. To indicate that network coding is to be used, one field may be added into each of the interest packet and the data packet semantics. The header of the interest packet may contain three fields: Content Name, Selector, and Nonce. In accordance with a disclosed embodiment, the selector field may comprise a flag allowing the transmission of network coded chunks in response to the Interest carrying this flag.

This flag may be turned on, for instance, in any case where multiple packets could be received in response to the interest (e.g., because it is broadcasted to several neighbours or sent over multiple interfaces). The flag also could be leveraged in the caching policy to decide whether or not to cache encoded chunks. The flag may be required as some data exchanges may require the packet to be received in a specific order, for instance to start streaming a video before all chunks are received. In this case, the network coding may also be applied to small groups of chunks, e.g. the first k chunks, then the next k, etc. The stream may only need to receive k chunks before starting, which may be similar to the buffering mechanisms in current video players.

A data packet issued in response of such an interest may carry a modified field. Currently, the structure of a data packet contains the content name, a signature, some signed information and the data. The signed information may carry the coefficient of the linear combinations, and the data may carry the encoded object thus described in the signed information.

The operation of Network Coding for CCN (NC3N) may work as follows. If the sender of the interest supports network coding, it sets the flag up in the Interest. Upon forwarding a response to the interest, each node may look up the number of coefficients and generate an encoded version. Each response to an interest may generate a new encoded version so that the receiver of the content gets new degrees of freedom with each chunk it gets. Intermediate nodes may cache the encoded chunk. If the intermediate node holds several such chunks, the intermediate node may also generate new combinations. If the intermediate node holds enough chunks to decode, then the node may do so. An intermediate node should respond to an interest only if it can provide new degrees of freedom from those mentioned in the interest selector.

Figure 4:
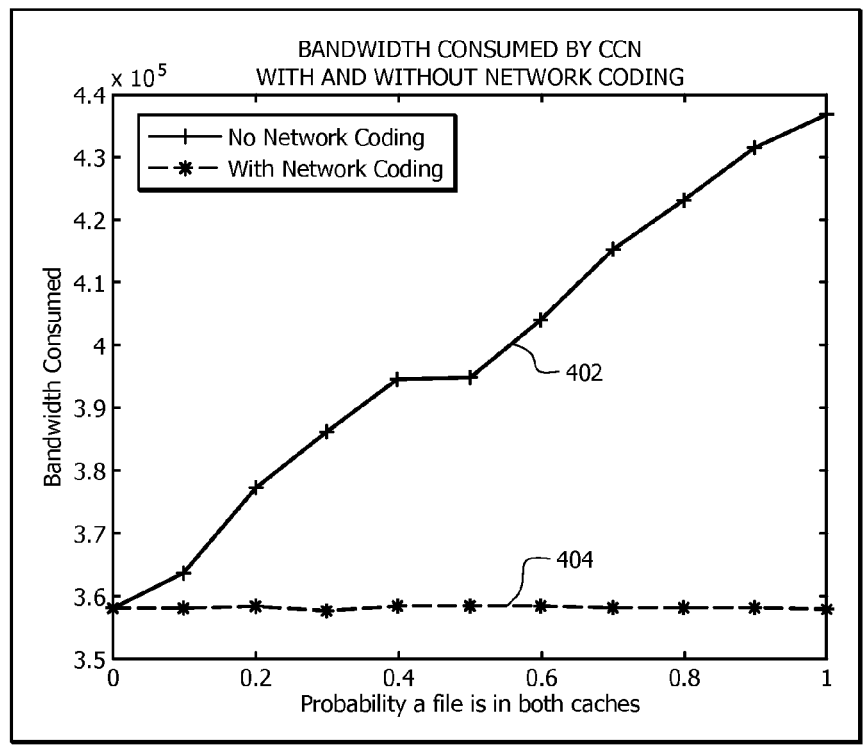
FIG. 4 is a chart illustrating the improvement in bandwidth consumption provided by the disclosed network coding.

FIG. 4 is a chart 400 illustrating the improvement in bandwidth consumption provided by the disclosed network coding. The chart shows bandwidth consumed as a function of the probability that a file is in both of two caches. Graph 402 shows the bandwidth consumed to retrieve content in a CCN environment when network coding is not used and graph 404 shows the bandwidth consumed to retrieve content in the CCN environment using the disclosed network coding. As shown, the bandwidth consumed when using network coding stays constant even as the probability that a file is in both caches increases. However, when not using network coding, the bandwidth consumer increases as the probability of the file being in both caches increases.

Figure 5:
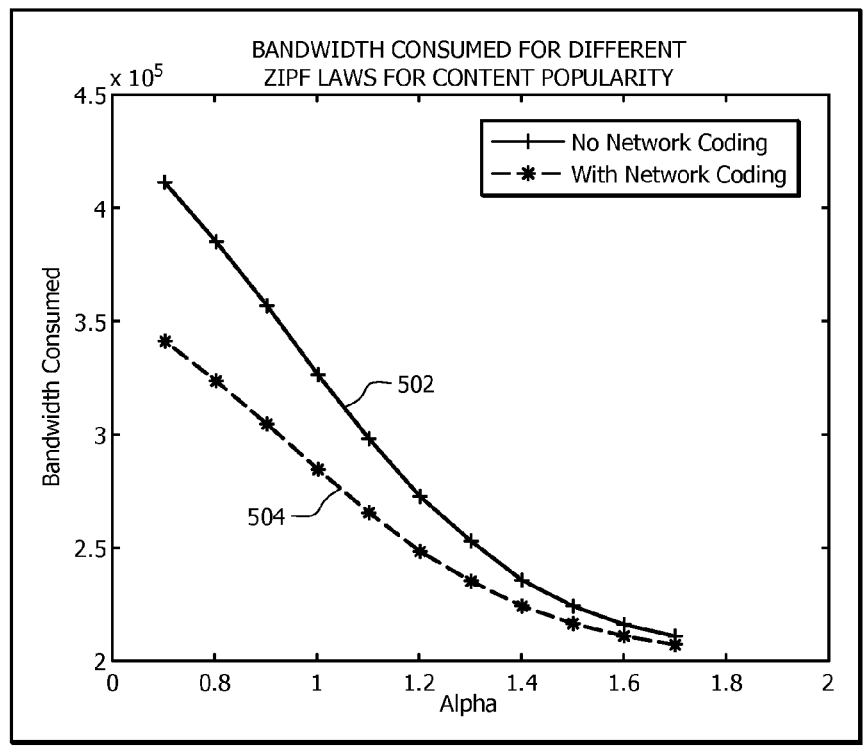
FIG. 5 is a chart illustrating the difference in the bandwidth consumer for different Zipf laws for content popularity between networks using network coding and networks not using network coding.

FIG. 5 is a chart 500 illustrating the difference in the bandwidth consumer for different Zipf laws for content popularity between networks using network coding and networks not using network coding. A Zipf law is an empirical law formulated using mathematical statistics. Graph 502 represents the bandwidth consumer without using network coding while graph 504 represents the bandwidth consumed versus alpha using network coding. Alpha is the exponent in the Zipf distribution. That is, the popularity of the content goes as $$\left(\frac{1}{k}\right)^{alpha}$$

for the $k^{th}$ most popular content. As shown, less bandwidth is consumed when using network coding than when not using network coding.

Figure 6:
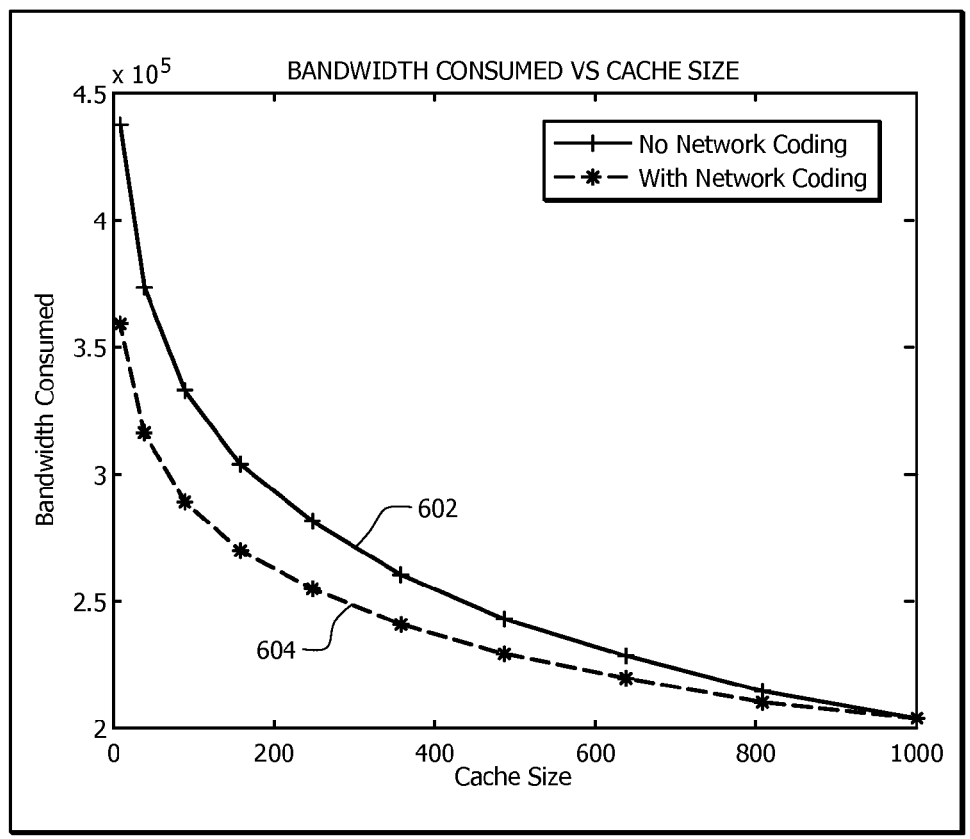
FIG. 6 is a chart illustrating bandwidth consumption as a function of cache size for networks utilizing the disclosed network coding and for networks not utilizing the disclosed network coding.

FIG. 6 is a chart 600 illustrating bandwidth consumption as function of cache size for networks utilizing the disclosed network coding and for networks not utilizing the disclosed network coding. Graph 602 shows the bandwidth consumed as a function of cache size for networks not using network coding and graph 604 shows the bandwidth consumed as a function of cache size for networks using the disclosed network coding. As shown, the disclosed network coding reduces bandwidth consumption for all cache sizes as compared with a system that does not use network coding.

Figure 7:
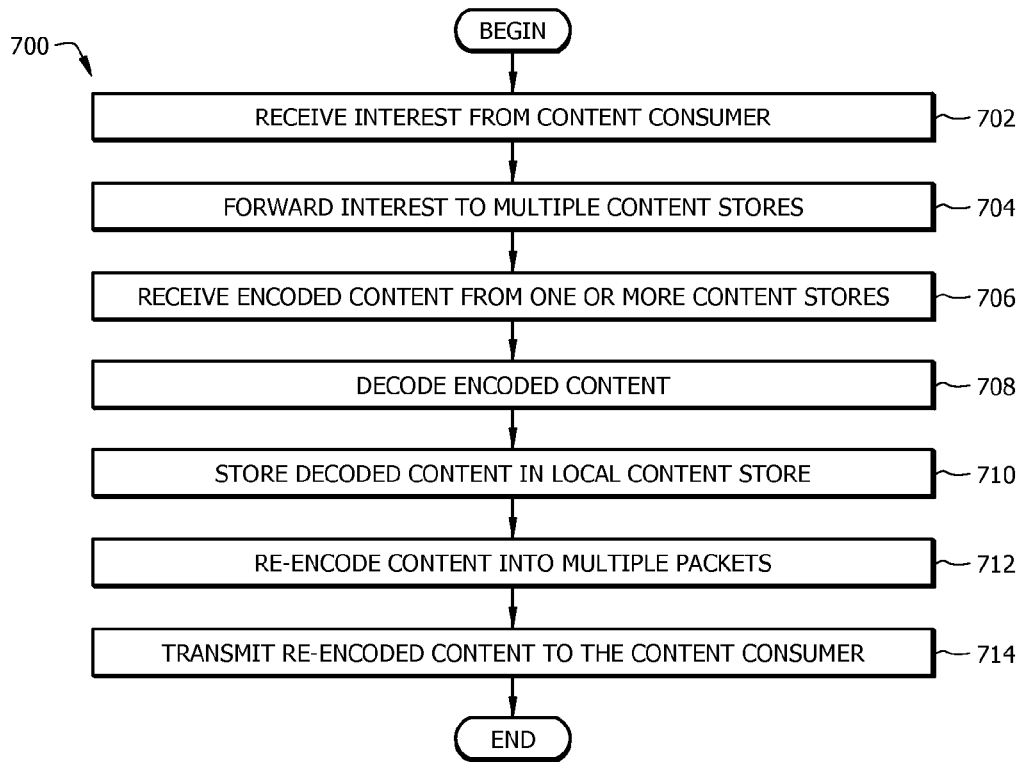
FIG. 7 is a flowchart illustrating a method for routing interest and data packets using network coding in accordance with a disclosed embodiment.

FIG. 7 is a flowchart illustrating a method 700 for routing interest and data packets using network coding in accordance with a disclosed embodiment. The method 700 may be implemented in the network node 302 depicted in FIG. 3 when receiving a request for content from a content consumer. The method 700 may begin at block 702 where the network node may receive an interest from the content consumer. At block 704, the network node may forward the interest to multiple content stores. At block 706, the network node may receive encoded content from one or more of the content stores. At block 708, the network node may decode the encoded content. At block 710, the network node may store the decoded content in its local content store. At block 712, the network node may re-encode the content into multiple packets and, at block 714, the network node may transmit the re-encoded content to the content consumer, after which, the method 700 may end.

Figure 8:
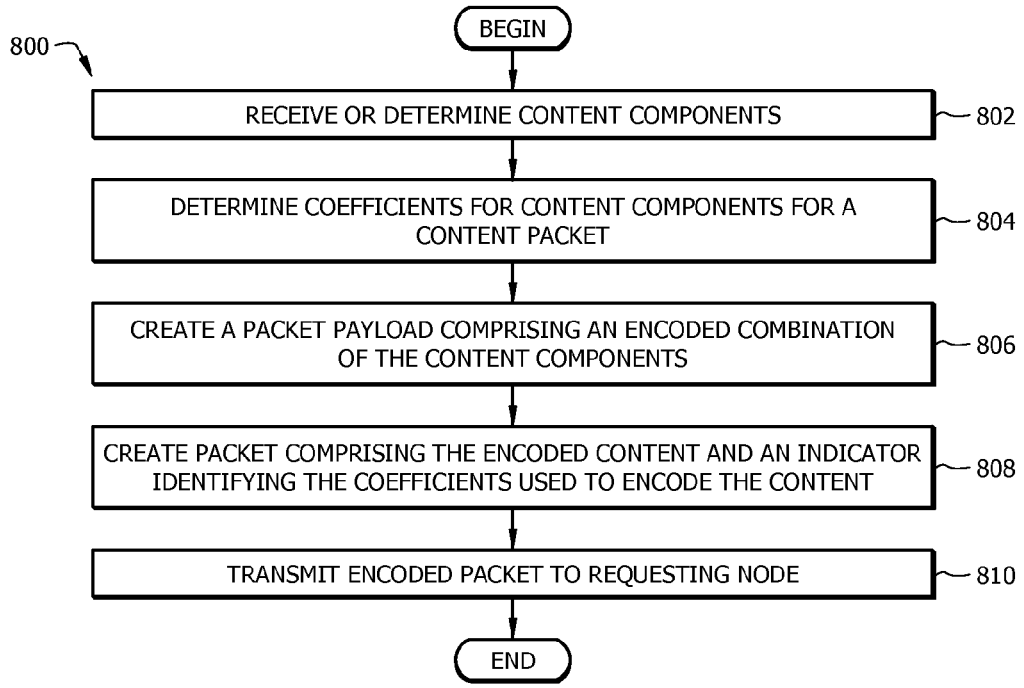
FIG. 8 is a flowchart illustrating a method implemented by a content store for encoding and transmitting content in response to receipt of an interest in accordance with a disclosed embodiment.

FIG. 8 is a flowchart illustrating a method 800 implemented by a content store for encoding and transmitting content in response to receipt of an interest in accordance with a disclosed embodiment. The method 800 may be implemented in either one of the content stores 306, 308 depicted in FIG. 3 when it receives a request for content. The method 800 may begin at block 802, where a content store may receive or determine the content components or chunks. At block 804, the content store may determine coefficients for the content components for a content packet (e.g., a data packet). At block 806, the content store may create a packet payload comprising an encoded combination of the content components. The encoded combination may be a linear combination of the content components. At block 808, the content store may create a packet comprising the encoded content and an indicator identifying the coefficients used to encode the content. At block 810, the content store may transmit the encoded packet to the requesting network node, after which the method 800 may end. The content store may send another encoded packet that may be linear independent of the previous encoded packet if requested by a requesting network node.

Figure 9:
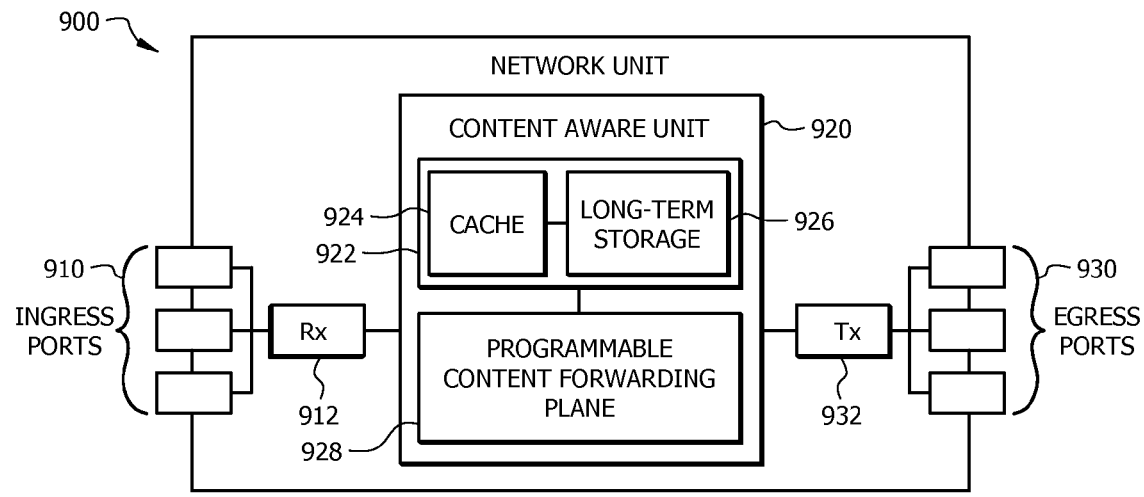
FIG. 9 illustrates an embodiment of a network node, which may be any device that transports and processes data through a network.

FIG. 9 illustrates an embodiment of a network node 900, which may be any device that transports and processes data through a network. For instance, the network node 900 may be a content router or any node or router in the network-coded schemes described above. The network node 900 may be implemented as one or more of network nodes 302, 304, 306 described above. The network node 900 may be configured to implement or support the network coding strategies described above. The network node 900 may comprise one or more ingress ports or faces 910 coupled to a receiver (Rx) 912 for receiving signals and frames/data from other network components. The network node 900 may comprise a content aware unit 920 to determine which network components to send content to. The content aware unit 920 may be implemented using hardware, software, or both. The content aware unit 920 may be a general purpose processor, an application specific integrated circuit (ASIC), or a digital signal processor (DSP). The general purpose processor may comprise multiple processors and/or processors with multiple cores. The network unit 900 may also comprise one or more egress ports or faces 930 coupled to a transmitter (Tx) 932 for transmitting signals and frames/data to the other network components. The receiver 912, content aware unit 920, and transmitter 932 may also be configured to implement at least some of the disclosed methods, which may be based on hardware, software, or both. The components of the network node 900 may be arranged as shown in FIG. 9.

The content aware unit 920 may also comprise a programmable content forwarding plane block 928 and one or more storage blocks 922 that may be coupled to the programmable content forwarding plane block 928. The programmable content forwarding plane block 928 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table at the content aware unit 920 or the network unit 900. The programmable content forwarding plane block 928 may interpret user requests for content and accordingly fetch content, e.g., based on metadata and/or content name, from the network or other content routers and may store the content, e.g., temporarily, in the storage blocks 922. The programmable content forwarding plane block 928 may then forward the cached content to the user. The programmable content forwarding plane block 928 may be implemented using software, hardware, or both and may operate above the IP layer or layer 2 (L2) in the OSI model. The storage blocks 922 may comprise a cache 924 for temporarily storing content, such as content that is requested by a subscriber. Additionally, the storage blocks 922 may comprise a long-term storage 926 for storing content relatively longer, such as content submitted by a publisher. For instance, the cache 924 and the long-term storage 926 may include Dynamic random-access memories (DRAMs), solid-state drives (SSDs), hard disks, or combinations thereof.

Figure 10:
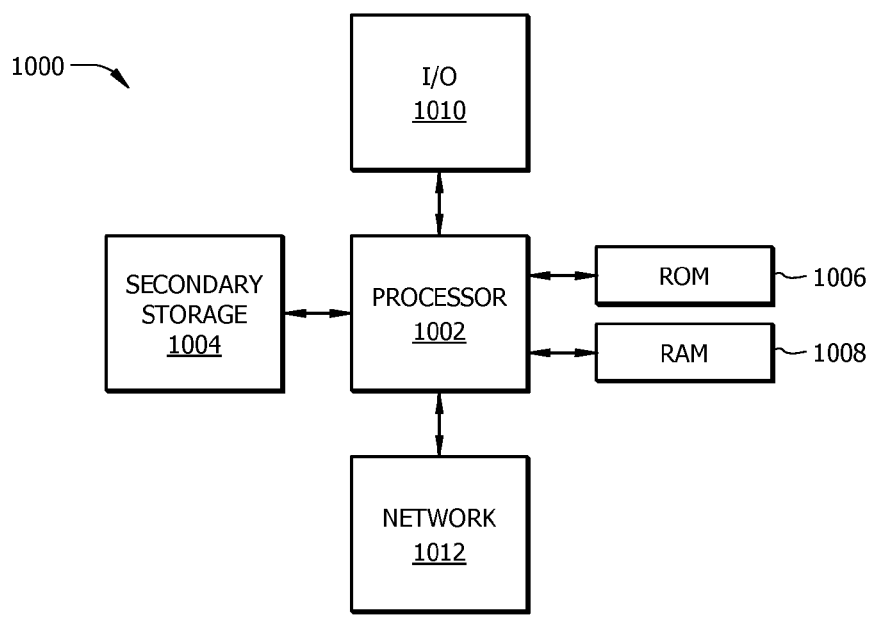
FIG. 10 illustrates a typical, general-purpose network component suitable for implementing one or more embodiments of the components disclosed herein.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. For example, the network component 1000 may be implemented as the content consumer 308 or one or more of network nodes 302, 304, 306 depicted in FIG. 3. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more ASICs.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network node, comprising:
    a data store comprising a content object, wherein the content object comprises multiple content chunks;
    a receiver configured to receive a request from a requesting network node for at least one chunk of the content object;
    a transmitter configured to transmit data; and
    a processor coupled to the receiver, the transmitter, and the data store, wherein the processor is configured to encode the content using the multiple content chunks and to instruct the transmitter to transmit the encoded content and an encoding indicator to the requesting network node, and wherein the encoding indicator provides the requesting network node with an encoding mechanism that the requesting network node uses to decode the encoded content in the payload into the multiple content chunks after the requesting network node receives a number of packets comprising the encoded content equal to the number of content chunks that comprise the content object.

2. The network node of claim 1, wherein the encoded content comprises a linear combination of the content chunks.

3. The network node of claim 2, wherein the encoded indicator comprises an indication of the coefficients for the linear combination of the content chunks.

4. The network node of claim 1, wherein the processor is configured to construct and instruct the transmitter to send a plurality of packets, wherein each packet comprises an encoded content, and wherein each encoded content is linearly independent of every other encoded content such that the content chunks are obtainable from the plurality of packets.

5. The network node of claim 1, wherein the encoding indicator comprises a flag in a header of a packet.

6. The network node of claim 1, wherein the encoding indicator comprises a semantic added to a name of the content object in a packet comprising the encoded content.

7. A method in a content router for retrieving content in a content centric network, comprising:
    receiving a request for content from a content consumer, wherein the content comprises a plurality of content chunks;
    forwarding the request to multiple network nodes;
    receiving a plurality of reply packets from one or more of the multiple network nodes, wherein each of the reply packets comprises a linear combination of the plurality of content chunks, wherein each linear combination of the plurality of content chunks is linearly independent of the other linear combinations of the plurality of content chunks, and wherein each reply packet comprises coefficients used to create the linear combination of the plurality of content chunks; and
    decoding with a processor the plurality of packets to obtain the decoded plurality of content chunks.

8. The method of claim 7 further comprising storing the decoded plurality of content chunks in a local content store.

9. The method of claim 7 further comprising forwarding the un-decoded reply packets to the content consumer as the reply packets are received.

10. The method of claim 7, wherein the reply packets may be received asynchronously.

11. The method of claim 7 further comprising re-encoding with the processor the reply packets into consumer reply packets and transmitting the consumer reply packets to the content consumer.

12. The method of claim 7 further comprising transmitting a message to each of the multiple network nodes to instruct the multiple network nodes to send additional packets if the content router has not received a sufficient number of packets to determine the plurality of content chunks.

13. The method of claim 7, wherein a header in the packets is used to indicate the coefficients.

14. The method of claim 7, wherein the name of the content object is modified to indicate the coefficients.

15. A content router in a content centric network, comprising:
   a receiver configured to receive a request for content, wherein the request comprises a content name, wherein the content comprises a plurality of content chunks;
   a processor coupled to the receiver and configured to determine a plurality of network nodes containing at least some of the content chunks; and
   a transmitter configured to forward the request to the plurality of network nodes,
   wherein the receiver is further configured to receive a plurality of reply packets from at least some of the plurality of network nodes,
   wherein each reply packet comprises a linear combination of the plurality of content chunks and an indicator of the integer coefficients used by the one of the plurality of network nodes to create the linear combination, and
   wherein the processor is further configured to obtain the plurality of content chunks from the plurality of reply packets using the linear combination of the plurality of content chunks from each of the plurality of reply packets and the integer coefficients associated with each linear combination.

16. The content router of claim 15, further comprising a local data storage configured to store the decoded plurality of content chunks.

17. The content router of claim 15, wherein the transmitter is further configured to transmit the decoded plurality of content chunks to a requesting node.

18. The content router of claim 15, wherein the processor is further configured to create a recoded plurality of linear combinations of the plurality of content chunks and instruct the transmitter to transmit each of the recoded plurality of linear combinations of the plurality of content chunks to a requesting node.

19. The content router of claim 15, wherein the processor is configured to determine the plurality of content chunks after receiving a specified number of the reply packets from the multiple network nodes, and wherein the specified number is equal to the number of content chunks in the plurality of content chunks.

20. The content router of claim 16, wherein the reply packets comprise a flag and wherein the processor is configured to instruct the local data storage to store the reply packet based on the flag.

* * * * *